April 2, 1963
F. C. HUYSER
3,083,566
TESTING MACHINES
Filed Jan. 28, 1959
3 Sheets-Sheet 1
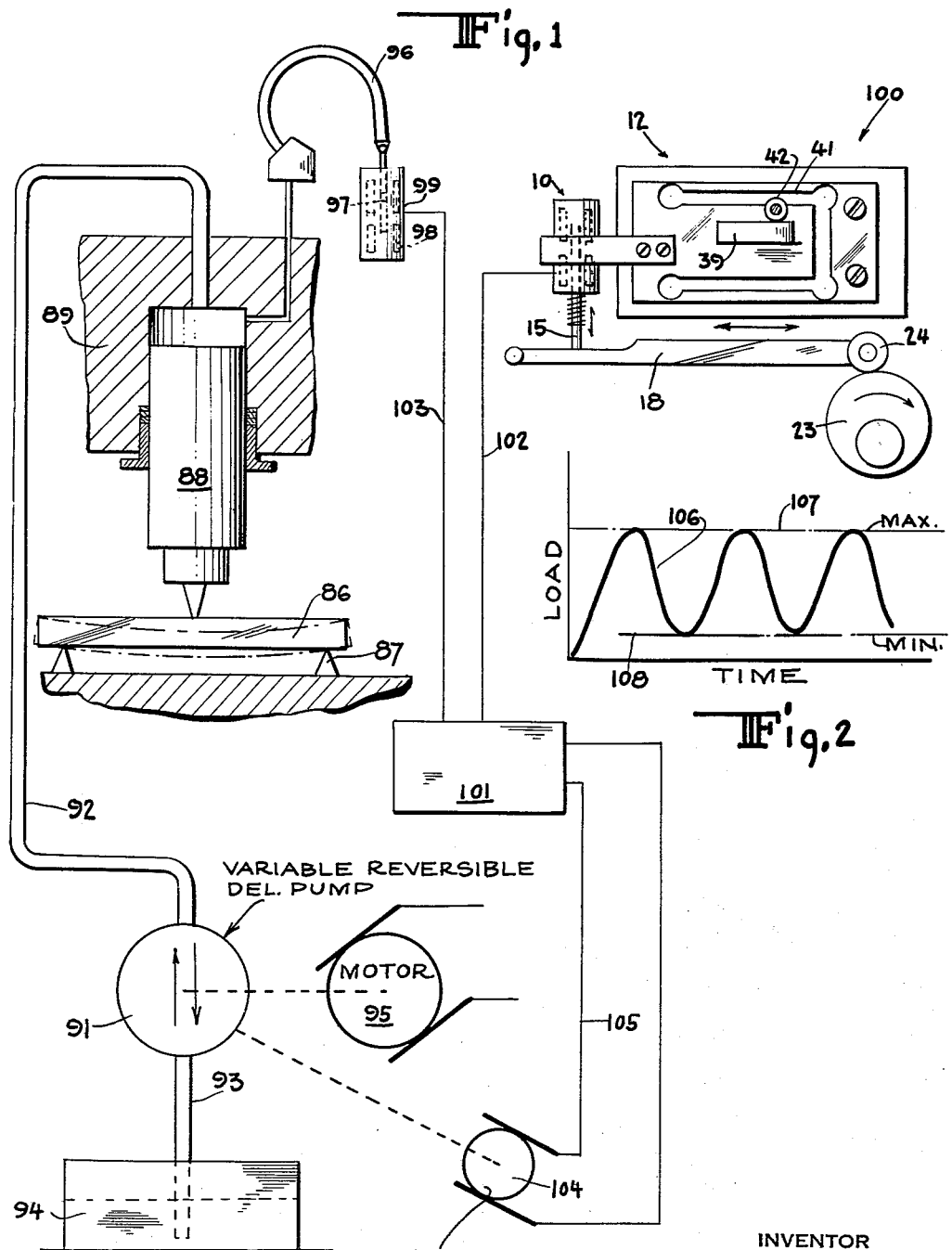
INVENTOR
FRANCIS C. HUYSER
BY
Pollard, Johnston, Smythe & Robertson
ATTORNEY

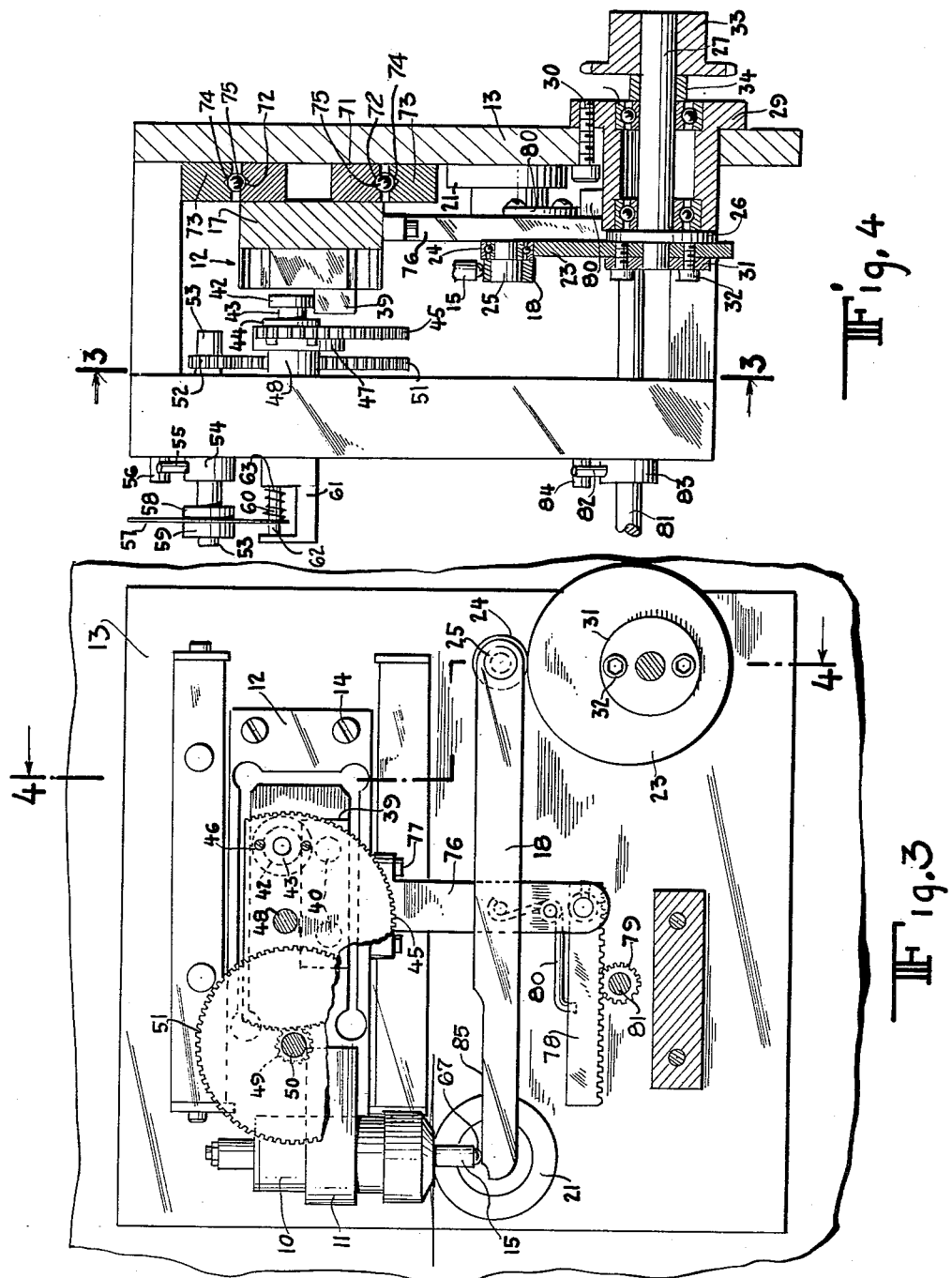

April 2, 1963

F. C. HUYSER 3,083,566

TESTING MACHINES

Filed Jan. 28, 1959

INVENTOR
FRANCIS C. HUYSER
BY
Pollard, Johnston, Smythe & Robertson
ATTORNEY

United States Patent Office 3,083,566
Patented Apr. 2, 1963

3,083,566
TESTING MACHINES
Francis C. Huyser, Moline, Ill., assignor to Ametek, Inc., a corporation of Delaware
Filed Jan. 28, 1959, Ser. No. 789,574
12 Claims. (Cl. 73—90)

The present invention relates to fatigue testing and especially to an arrangement for producing a control signal of predetermined wave form and magnitude for use therein.

In one form of previously available fatigue testing equipment, a motor, driving eccentric weights, is attached to the test specimen so as to impress an alternating force of predetermined value on the specimen. Such equipment is limited by practical considerations as to the magnitude and amplitude of alternating load that may be applied to the specimen. Furthermore, the characteristic of the alternating load, which is usually sinusoidal, is not conveniently varied. Other types of prior fatigue testing machines have not been entirely satisfactory.

In fatigue testing, it is often the practice to maintain a level of constant stress in the specimen and to apply an additional alternating stress. Weights or spring loads may be used to establish the constant stress while equipment such as the driven eccentric weights apply the alternating stresses. Fatigue testing procedures may require that various steady stress levels as well as various ranges of alternating stress be applied. Consequently, the test equipment should be versatile and readily adjusted.

Loading the test specimen by a hydraulic actuator is one way of applying very large alternating forces to a test specimen. A hydraulic actuator is a loading means compatible with the large deflections which may occur in the test specimen and it is also capable of varying the load at a sufficiently high frequency. At the same time, a hydraulic actuator is suited to the maintenance of a steady level of loading with an alternating load applied to it. It is apparent that the hydraulic actuator must be controlled by the proper delivery of pressured fluid so as to apply the desired level of steady and alternating forces, with the desired loading characteristic, and at the desired frequency.

One of the primary objects of the present invention is to provide apparatus to generate a test signal of predetermined wave form.

Another object of the invention is to provide apparatus for controlling the application of load to a specimen undergoing fatigue testing.

A still further object is to provide a system for controlling a hydraulic loading device so as to apply a predetermined alternating load in the fatigue testing of a specimen.

The signal generator is arranged to produce an output signal of predetermined wave form. Means are provided for loading the test specimen and a pick-up produces an output as a function of the applied load, strain or displacement. The loading means is controlled by a means responsive to the difference of the signal generator output signal and the pick-up signal. In this manner the test specimen is loaded as a function of the predetermined wave form.

In one aspect, the invention includes a signal generator to produce a test signal of predetermined maximum output level amplitude, wave form and frequency to control the flow of pressured fluid to the specimen loading actuator of a hydraulically operated fatigue testing machine. The signal generator is readily adjusted so as to control the loading actuator for the various test procedures required in fatigue testing.

The generator includes a pivotally mounted lever which is reciprocated by a suitable drive and an adjustable transducer responsive to the motion of the reciprocating lever for producing the output signal. The transducer is adjustable along the longitudinal axis of the lever so that its position will determine the amplitude of the output signal. The maximum signal is adjustably determined.

These and other objects, features and advantages of the invention will become apparent from the following detailed description and drawings which are merely exemplary.

In the drawings:

FIG. 1 is a diagram of a control system for fatigue testing equipment machine.

FIG. 2 is a graph representation of the fluctuating load applied to a test specimen during a fatigue test.

FIG. 3 is a front elevational view of the signal generator.

FIG. 4 is a side elevational sectional view of the signal generator.

Figures 5, 6, 7:
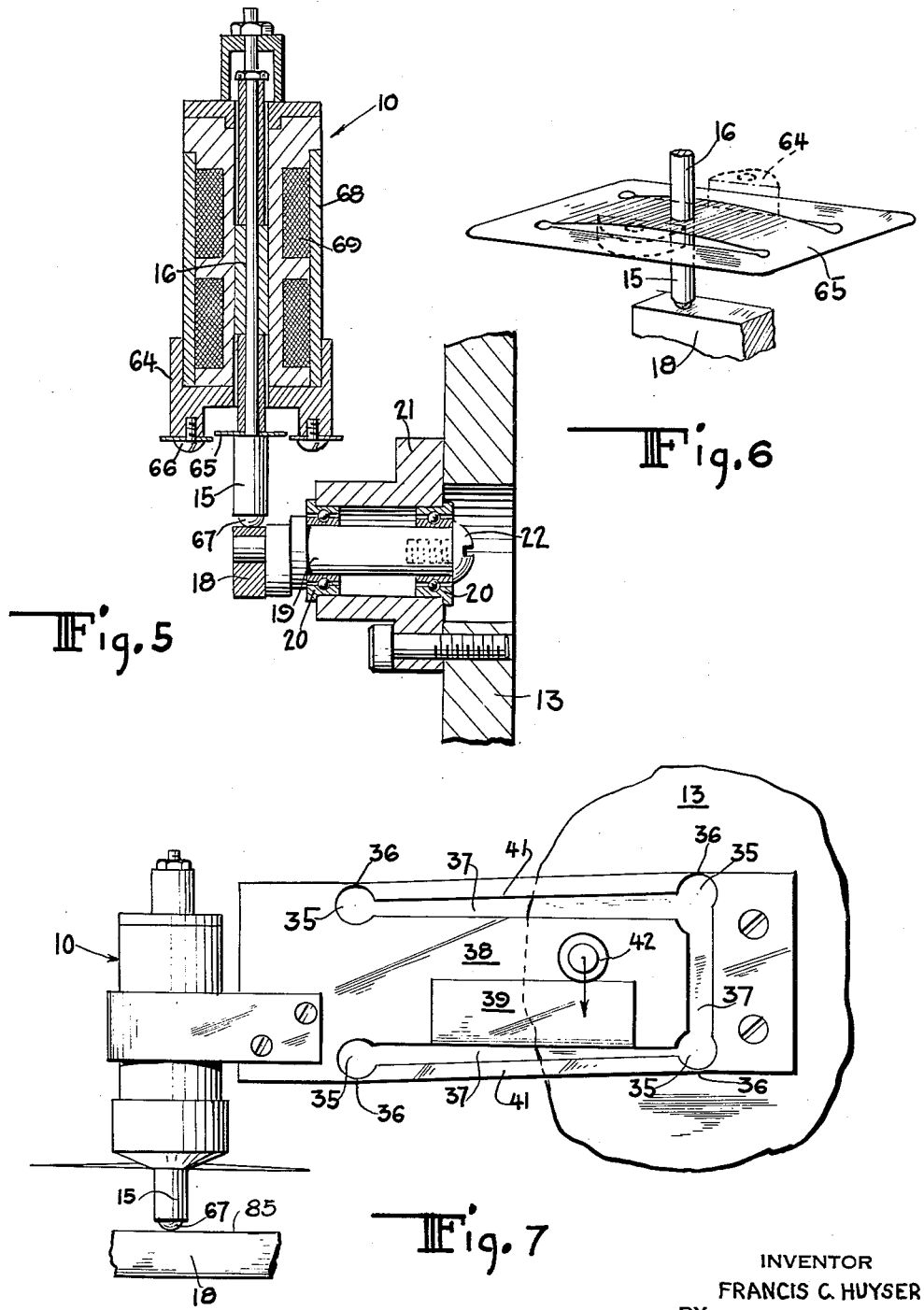
FIG. 5 is a sectional view of the signal generator transducer.
FIG. 6 is a perspective view of the spring restraint for the transducer armature.
FIG. 7 is a front elevational view of the transducer and its resilient support.

The signal generator is generally shown in FIGS. 3 and 4 wherein transducer 10 is attached by bracket 11 to the resilient support 12. Plunger 15 of the transducer armature 16 (FIG. 5) bears upon lever 18. Resilient support 12 is mounted on support member 17 by screws 14. As shown in FIG. 5, lever 18 is attached to shaft 19, mounted in ball bearings 20. Ball bearings 20 are supported with respect to the support member 13 by retainer 21 and screw 22 serves to hold shaft 19 within ball bearings 20.

Lever 18 (FIG. 3) is reciprocated by means of cam 23 and roller follower 24 mounted on stub shaft 25. Cam 23 (FIG. 4) is shown located against collar 26 of shaft 27 which is mounted in ball bearings 28. Bearings 28 are held within retainer 29 which is mounted on support member 13 by screws 30. Cam 23 is located against collar 26 by the clamping action of plate 31 and screws 32. Shaft 27 is driven by a motor (not shown) through pinion 33, which is mounted on shaft 27 against spacer 34. It is evident that cam 23 can be made of any shape to provide the desired wave form.

Resilient transducer support 12 (FIGS. 3, 7) may be fabricated from a single plate by being provided with drilled portions 35 which form thin wall sections 36 along the outer surface of the plate. The drilled portions 35 (FIG. 7) are connected by slots 37 so as to form a center cantilever section or portion 38. Block 39 is secured to the cantilever section 38 by screws 40 (FIG. 3). Drilled portions 35 and slots 37 form rigid links 41. Roller 42 is mounted upon shaft 43, the flanged portion 44 of which is attached to sector gear 45 by screws 46. Sector gear 45 is mounted against collar 47 on stub shaft 48.

In FIGS. 3 and 4, it may be seen that sector gear 45 is driven by pinion 49 mounted on stub shaft 50. Gear 51, which is also mounted on stub shaft 50, is driven by pinion 52 attached to adjustment shaft 53. Shaft 53 is provided with collar 54 in which is mounted stud 55. The rotational motion of shaft 53 is limited by stud 55 contacting stop 56. In order to secure shaft 53 from being inadvertently rotated by vibration or by action of the gear train, friction disc 57 is provided for locking shaft 53. Friction disc 57 is attached to shaft 53 by clamping members 58 and 59. Friction member 60 is mounted on bracket 61 proximate to the surface of friction disc 57. Bracket 61 also supports an additional friction member 62 which is loaded against friction disc 57 by means of spring 63. The braking action of members 60 and 62 on disc 57 serves to lock shaft 53 in any selected setting.

The armature plunger 15 (FIGS. 5, 6) is restrained with respect to the base 64 of transducer 10 by means of flat spring 65 which is attached to base 64 by screws 66. Spring 65 insures that the follower surface 67 of plunger 15 remains in contact with lever 18 while the lever is being reciprocated by the action of cam 23. Housing 68 of transducer 10 contains the windings 69 of the transformer pick-up. The coupling effect of armature 16 with windings 69 produces the output signal.

The output level of transducer 10 is determined by positioning the housing 68 with respect to the armature 16. This is accomplished by deflecting resilient support 12 to which the transducer 10 is attached by bracket 11. In FIG. 7, it may be seen that roller 42 is mounted on sector gear 45 which is positioned by the gear train leading from shaft 53. Thus, by rotating shaft 53, roller 42 may be positioned in a downward manner against block 39 so as to apply a vertical downward force upon the block. Under the loading of roller 42, the cantilever section 38 will experience clockwise moments while links 41 will experience counterclockwise moments. The resulting force and moments will deflect the resilient support 12, as shown in an exaggerated manner in FIG. 7, the major portion of deflection occurring at the thin wall section 36. Due to the location of roller 42 with respect to block 39 and also the locations of the thin wall sections 36, the resilient support 12 will generally experience a downward deflection but the transducer 10 and its bracket 11 will descend in substantially a vertical direction. It should be understood that because of the gear ratio between adjustment shaft 53 and sector gear 45, the downward movement of roller 42 is of a limited degree.

The support plate 17 (FIG. 4) is attached to sliding member 71 which is provided with grooves 72. Above and below sliding member 71 are located guide members 73, having grooves 74. Balls 75 within grooves 72 and 74 support sliding member 71 with respect to the guide members. In FIG. 3, arm 76 is shown attached to the resilient support 12 by means of screws 77. Arm 76 is pivotally connected to rack 78, which is in mesh with pinion 79. Spring 80 serves to preload the teeth of rack 78 against the teeth of pinion 79. Rack 78 is positioned by rotating shaft 81 on which pinion 79 is mounted. The rotational motion of shaft 81 is limited by stud 82 mounted on collar 83 for contacting stop 84.

The motion of plunger 15 (FIGS. 3, 7) may be placed at various locations along surface 85. A particular location along surface 85 is obtained by rotating shaft 81 so as to drive rack 78 through pinion 79 and thereby move arm 76 attached to support member 17. Resilient support 12 will thereby be moved to the right or left, as required, carrying with it the transducer 10.

FIG. 1 is a schematic representation of fatigue testing equipment in which the subject signal generator may be used. The test specimen 86 mounted on supports 87 is loaded in bending by piston 88 of hydraulic actuator 89. Hydraulic fluid under pressure is provided to actuator 89 by variable delivery pump 91 through line 92. Line 93 connects pump 91 to the sump 94 of the hydraulic system. Variable delivery pump 91 is driven by motor 95. The hydraulic pressure within actuator 89 is detected by pressure pick-up 96 which positions armature 97 with respect to the windings 98 of transformer pick-up 99. Signal generator 100 provides a reference signal to control the program and magnitude of loading for test specimen 86. The maximum load for the test for a given position of transducer 10 along lever 18 is determined by setting the signal generator with roller follower 24 at the maximum point of cam 23. At this reference location, lever 18 is designed to be substantially level. This setting is made by deflecting resilient support 12 by roller 42 bearing upon block 39. The resulting deflection of resilient support 12 positions transducer 10 and thereby determines its maximum output signal. The output signal of transducer 10 is connected to amplifier 101 by means of lead 102. The output of transformer pick-up 99 is connected by lead 103 to amplifier 101, where it is compared to the output signal of transducer 10. The comparison of the two signals produces an error signal which is connected to pump servo control 104 by leads 105.

FIG. 2 is a graphical representation of a typical loading pattern for a fatigue test. It indicates that the load may be varied between maximum and minimum limits in a cyclic manner, the maximum and minimum limits being disposed on opposite sides of a bias level. The shape of loading curve 106 may be determined by the selection of cam 23. The maximum value of the load indicated by line 107 and at the same time the bias level is selected by preloading the resilient support 12 by means of the action of roller 42 on block 39. This determines the maximum output signal from the windings of transducer 10. The amplitude of the loading curve 106, as indicated by the excursion about the bias level between minimum line 108 and maximum line 107, is determined by the positioning of plunger 15 of transducer 10 along surface 85 of lever 18.

Signal generator 100 provides a reference test signal to amplifier 101. The pressure condition within actuator 89 is sensed by transformer pick-up 99 and connected to amplifier 101 for comparison to the reference test signal from signal generator 100. It is evident that for known dimensions of actuator 89, the pressure within it is equivalent to a known load value applied to specimen 86. In the case where the pressure and consequently the load of actuator 89 as sensed by pick-up 99 is not equal to the reference signal from generator 100, an amplified error signal is furnished to the servo control 104 which controls the delivery of pressure fluid from pump 91. In this manner, the pressure within actuator 89 is made to follow precisely the test reference signal from generator 100. In effect, servo control 104 may cyclically shunt sufficient output pressure fluid from pump 91 to sump 94 so as to obtain the load curve 106 indicated in FIG. 2. The frequency of the fluctuating load applied to specimen 86 may be varied by controlling the speed of the driving device for cam 23.

As shown in FIG. 1, lever 18 and surface 85 are substantially parallel to the path of adjustment of resilient support 12 whenever follower 24 is at the uppermost position of cam 23. With this relationship, it is evident that lateral adjustment of resilient support 12 so as to vary the amplitude of the loading curve 106 will not effect the bias level or value of the maximum load as indicated by line 107. Thus, the maximum test value may be maintained constant while the minimum value may be increased or decreased. The maximum value is set by the adjustment of roller 42 in bearing on block 39 of the resilient support 12.

It should be apparent that details of construction and form can be varied without departing from the spirit of the invention except as defined in the appended claims.

What is claimed is:

1. A signal generator including pivotally mounted lever means, means for reciprocating said lever means, said reciprocating means having a predetermined extent of travel, and means for producing an output having a bias level, said signal producing means being responsive in the plane of reciprocation to the motion of the portion of said lever means adjacent thereto to produce an output signal having an amplitude with respect to its bias level equal to a function of said motion, the relative position of said signal producing means and said lever means along the longitudinal extent of the latter being adjustable to select the ratio of said motion to said extent of travel, whereby said output signal amplitude is determined by said relative position of said signal producing means and said lever means.

2. A signal generator including pivotally mounted lever means, means for reciprocating said lever means, said reciprocating means having a predetermined extent of travel, and means for producing an output signal having a selectable bias level, said signal producing means being responsive in the plane of reciprocation to the motion of the portion of said lever means adjacent thereto to produce an output signal having an amplitude with respect to its bias level equal to a function of said motion, the relative position of said signal producing means and said lever means along a line substantially perpendicular to the longitudinal axis of said lever means being adjustable, whereby said output signal bias level is determined by said relative position of said signal producing means and said lever means.

3. A signal generator including pivotally mounted lever means, means for reciprocating said lever means, said reciprocating means having a predetermined extent of travel, means for producing an output signal having a bias level, said signal producing means being responsive in the plane of reciprocation to the motion of the portion of said lever means adjacent thereto to produce an output signal having an amplitude with respect to its bias level equal to a function of said motion, and means for positioning said signal producing means along the longitudinal extent of said lever means to select the ratio of said motion to said extent of travel, whereby said output signal amplitude is determined by said positioning of said signal producing means.

4. A signal generator including pivotally mounted lever means, means for reciprocating said lever means, said reciprocating means having a predetermined extent of travel, means for producing an output signal having a selectable bias level, said signal producing means being responsive in the plane of reciprocation to the motion of the portion of said lever means adjacent thereto to produce an output signal having an amplitude with respect to its bias level equal to a function of said motion, said motion being in a predetermined ratio to said extent of travel as determined by the distance from said pivotal mount to said lever portion and means for positioning said signal producing means relative to said lever means along a line substantially perpendicular to the longitudinal axis of said lever means, whereby said output signal bias level is determined by said positioning of said signal producing means relative to said lever means.

5. A signal generator including pivotally mounted lever means, means for reciprocating said lever means, said reciprocating means having a predetermined extent of travel, resilient support means, means for producing an output signal having a selectable bias level, said signal producing means being responsive in the plane of reciprocation to the motion of the portion of said lever means adjacent thereto to produce an output signal having an amplitude with respect to its bias level equal to a function of said motion, said motion being in a predetermined ration to said extent of travel as determined by the distance from said pivotal mount to said lever portion, said signal producing means being mounted on said resilient support means, and means for applying force to said resilient support means to adjust the relative position of said signal producing means and said lever means along a line substantially perpendicular to the longitudinal axis of said lever means, whereby said output signal bias level is determined by said relative position of said signal producing means and said lever means.

6. A signal generator including pivotally mounted lever means, means for reciprocating said lever means, said reciprocating means having a predetermined extent of travel, means for producing an output signal having a selectable bias level, said signal producing means being responsive in the plane of reciprocation to the motion of the portion of said lever means adjacent thereto to produce an output signal having an amplitude with respect to its bias level equal to a function of said motion, said motion being in a predetermined ratio to said extent of travel as determined by the distance from said pivotal mount to said lever portion, first means for adjusting the relative position of said signal producing means and said lever means along the longitudinal extent of the latter, and second means for adjusting the relative position of said signal producing means and said lever means along a line substantially perpendicular to the longitudinal axis of said lever means, whereby said output signal amplitude is determined by the adjustment from said first means and said bias level is determined by the adjustment from said second means.

7. A signal generator including pivotally mounted lever means, means for reciprocating said lever means, said reciprocating means having a predetermined extent of travel, means for producing an output signal having a selectable bias level, said signal producing means being responsive in the plane of reciprocation to the motion of the portion of said lever means adjacent thereto to produce an output signal having an amplitude with respect to its bias level equal to a function of said motion, means for adjusting the relative position of said signal producing means and said lever means along a line parallel to the longitudinal axis of said lever means with said lever means in a limit position as determined by said reciprocating means to select the ratio of said motion to said extent of travel, whereby said output signal amplitude is determined by said relative position of said signal producing means and said lever means and has a constant limit value.

8. A signal generator having pivotally mounted lever means, means for reciprocating said lever means, said reciprocating means having a predetermined extent of travel, means for producing an output signal having a selectable bias level, said signal producing means being responsive in the plane of reciprocation to the motion of the portion of said lever means adjacent thereto to produce an output signal having an amplitude with respect to its bias level equal to a function of said motion, said motion being in a predetermined ration to said extent of travel as determined by the distance from said pivotal mount to said lever portion, resilient means for supporting said signal producing means, and means for applying force to said resilient support means to adjust the relative position of said signal producing means and said lever means along a line substantially perpendicular to the longitudinal axis of said lever means, said resilient support means including base means, a plurality of link means spaced apart and substantially parallel to one another, arm means interposed between said link means, and cantilever resilient means connecting said plurality of link means to said arm means at one end and to said base means at the other end of each of said link means, said signal producing means being mounted on said arm means, said means for applying force to said resilient support means engaging said arm means, whereby output signal bias level is determined by said relative position of said signal producing means and said lever means.

9. A signal generator including pivotally mounted lever means, means for reciprocating said lever means, said reciprocating means having a predetermined extent of travel, means for producing an output signal having a selectable bias level, said signal producing means being responsive in the plane of reciprocation to the motion of the portion of said lever means adjacent thereto for producing an output signal having an amplitude with respect to its bias level equal to a function of said motion, said motion being in a predetermined ratio to said extent of travel as determined by the distance from said pivotal mount to said lever portion, support means, means for moving said support means for adjustment along a line substantially parallel to the longitudinal axis of said lever means, arm means attached to said signal producing means, a plurality of link means spaced apart and substantially parallel to one another, said arm means interposed between said link means, cantilever resilient means connecting said plurality of link means to said arm means at one end and to said support means at the other so as to support said arm means, said cantilever resilient means providing freedom of movement to said arm means in a plane substantially parallel to the plane of movement of said lever means and substantially perpendicular to the longitudinal axis of said lever means, and means for adjusting the position of said arm means in said plane, whereby said output signal amplitude is determined by adjustment of said movable plate and said output signal bias level is determined by adjustment of said arm means.

10. A machine for fatigue testing a test specimen including signal generator means having mechanical actuating means for producing an output signal with a predetermined varying waveform, said predetermined waveform corresponding to the waveform of the varying loading to be applied to the test specimen, means for loading said test specimen, said loading means including means for supplying hydraulic pressure fluid to be applied upon said test specimen, pick-up means having output signal as a function of the load applied to said test specimen, and means for controlling said supplying means, said controlling means being arranged to be responsive to the difference between the output signals of said signal generator means and said pick-up means, whereby said test specimen is loaded as a function of said predetermined waveform.

11. A machine for fatigue testing a test specimen including signal generator means having an output signal with a predetermined sinusoidal waveform, said predetermined waveform corresponding to the waveform of the varying loading to be applied to the test specimen, hydraulic actuator means for loading said specimen, means for delivering hydraulic fluid to said hydraulic actuator means, hydraulic pick-up means having an output signal of a function of the pressure within said hydraulic actuator means, and means for controlling said delivering means, said control means being responsive to the difference between the output signals of said signal generator means and said pick-up means, whereby said test specimen is loaded as a function of said predetermined waveform.

12. A machine for fatigue testing a test specimen including signal generator means having pivotally mounted lever means, means for reciprocating said lever means, said reciprocating means having a predetermined extent of travel, means for producing an output signal having a bias level, said signal producing means being responsive in the plane of reciprocation to the motion of said lever means with an output signal having an amplitude with respect to its bias level equal to a function of said motion, first means for adjusting the relative position of said signal producing means and said lever means along the longitudinal extent of the latter, and second means for adjusting the relative position of said signal producing means and said lever means along a line substantially perpendicular to the longitudinal axis of said lever means, the output signal amplitude being determined by adjustment from said first means and the output signal bias level determined by the adjustment from said second means, means for applying force to said test specimen, pick-up means having an output signal of a function of the force applied to said test specimen, and means for controlling said force applying means, said controlling means responsive to the difference between the output signals of said signal generator means and said pick-up means, whereby force is applied to said test specimen in a manner determined by said signal generator.

References Cited in the file of this patent

UNITED STATES PATENTS

| | | |
|---|---|---|
| 1,490,171 | Hendrickson | Apr. 15, 1924 |
| 2,194,914 | Ruch | Mar. 26, 1940 |
| 2,373,351 | Sims | Apr. 10, 1945 |
| 2,445,682 | MacGeorge | July 20, 1948 |

FOREIGN PATENTS

| | | |
|---|---|---|
| 839,680 | France | Jan. 4, 1939 |